(12) United States Patent
Young

(10) Patent No.: US 10,044,060 B1
(45) Date of Patent: Aug. 7, 2018

(54) SECONDARY BATTERIES WITH IMPROVED ELECTROLYTE

(71) Applicant: Edgar D Young, Lenoir, NC (US)

(72) Inventor: Edgar D Young, Lenoir, NC (US)

( * ) Notice: Subject to any disclaimer, the term of this patent is extended or adjusted under 35 U.S.C. 154(b) by 0 days.

(21) Appl. No.: 15/681,083

(22) Filed: Aug. 18, 2017

(51) Int. Cl.
| | |
|---|---|
| H01M 10/054 | (2010.01) |
| H01M 4/46 | (2006.01) |
| H01M 4/58 | (2010.01) |
| H01M 10/0568 | (2010.01) |
| H01M 10/0569 | (2010.01) |
| H01M 10/42 | (2006.01) |

(52) U.S. Cl.
CPC ........ *H01M 10/054* (2013.01); *H01M 4/466* (2013.01); *H01M 4/5825* (2013.01); *H01M 10/0568* (2013.01); *H01M 10/0569* (2013.01); *H01M 10/4235* (2013.01); *H01M 2220/20* (2013.01); *H01M 2300/004* (2013.01)

(58) Field of Classification Search
None
See application file for complete search history.

(56) References Cited

U.S. PATENT DOCUMENTS

| | | | |
|---|---|---|---|
| 4,797,333 A | 1/1989 | Coetzer et al. | |
| 4,975,344 A | 12/1990 | Wedlake et al. | |
| 5,324,599 A | 6/1994 | Oyama et al. | |
| 5,965,299 A | 10/1999 | Khan et al. | |
| 6,136,909 A | 10/2000 | Liao et al. | |
| 6,316,141 B1 | 11/2001 | Aurbach et al. | |
| 6,544,689 B1 | 4/2003 | Riley et al. | |
| 6,713,212 B2 | 3/2004 | Aurbach et al. | |
| 7,063,808 B1 | 6/2006 | Viswanathan | |
| 7,563,537 B2 | 7/2009 | Pratt et al. | |
| 8,334,070 B2 | 12/2012 | Ryu et al. | |
| 8,445,134 B2 | 5/2013 | Young | |
| 8,551,654 B2 | 10/2013 | Young | |
| 9,601,801 B2 | 3/2017 | Liao et al. | |
| 2002/0068222 A1* | 6/2002 | Ishii ...................... | H01M 4/628 429/347 |

(Continued)

OTHER PUBLICATIONS

Zhao-Karger, Zhirong, et al., "Performance Improvement of Magnesium Sulfur Batteries with Modified Non-Nucleophilic Electrolytes," Advanced Energy Materials journal, published online Oct. 6, 2014, published in print Feb. 4, 2015, vol. 5, No. 3, Wiley-VCH Verlag GmbH & Co., Weinheim, Germany.

*Primary Examiner* — Barbara L Gilliam
*Assistant Examiner* — Wyatt P McConnell
(74) *Attorney, Agent, or Firm* — Charlotte C. Wilson

(57) ABSTRACT

An electrochemical cell for a secondary battery is provided, which includes a positive electrode having an intercalation cathode material of treated smectite; a negative electrode material having an anode material containing magnesium; an electrolyte positioned in contact with at least one of the positive electrode and the negative electrode; wherein the electrolyte comprises a solvent in which magnesium chloride, aluminum chloride, and, optionally, magnesium hexamethyldisilazide are dissolved. The solvent is one or more of 2-methyl tetrahydrofuran; 2,5-dimethyl pyridine; 2,6-dimethyl pyridine; 3,5-dimethyl pyridine; 2,5-diethyl pyridine; 2-methyl-5-ethyl-pyridine; 2-ethyl-5-methyl-pyridine; 5-ethyl-3-methyl-pyridine; and 3-ethyl-5-methyl pyridine; and, optionally, pinene and/or ocimene.

12 Claims, 1 Drawing Sheet

(56) References Cited

U.S. PATENT DOCUMENTS

| | | |
|---|---|---|
| 2003/0143467 A1 | 7/2003 | Riley et al. |
| 2007/0009804 A1 | 1/2007 | Dixon et al. |
| 2007/0122709 A1 | 5/2007 | Pratt et al. |
| 2008/0014496 A1* | 1/2008 | Watanabe ............... H01M 2/34 429/129 |
| 2010/0279175 A1* | 11/2010 | Young .................... H01M 4/13 429/303 |
| 2011/0244338 A1* | 10/2011 | Muldoon ................ H01M 4/46 429/324 |
| 2014/0227597 A1* | 8/2014 | Nemoto ................ H01M 4/136 429/221 |
| 2014/0302403 A1* | 10/2014 | Doe ................... H01M 10/054 429/337 |
| 2015/0270576 A1* | 9/2015 | Yamaguchi ....... H01M 10/0567 429/337 |
| 2016/0020485 A1 | 1/2016 | Liao et al. |

\* cited by examiner

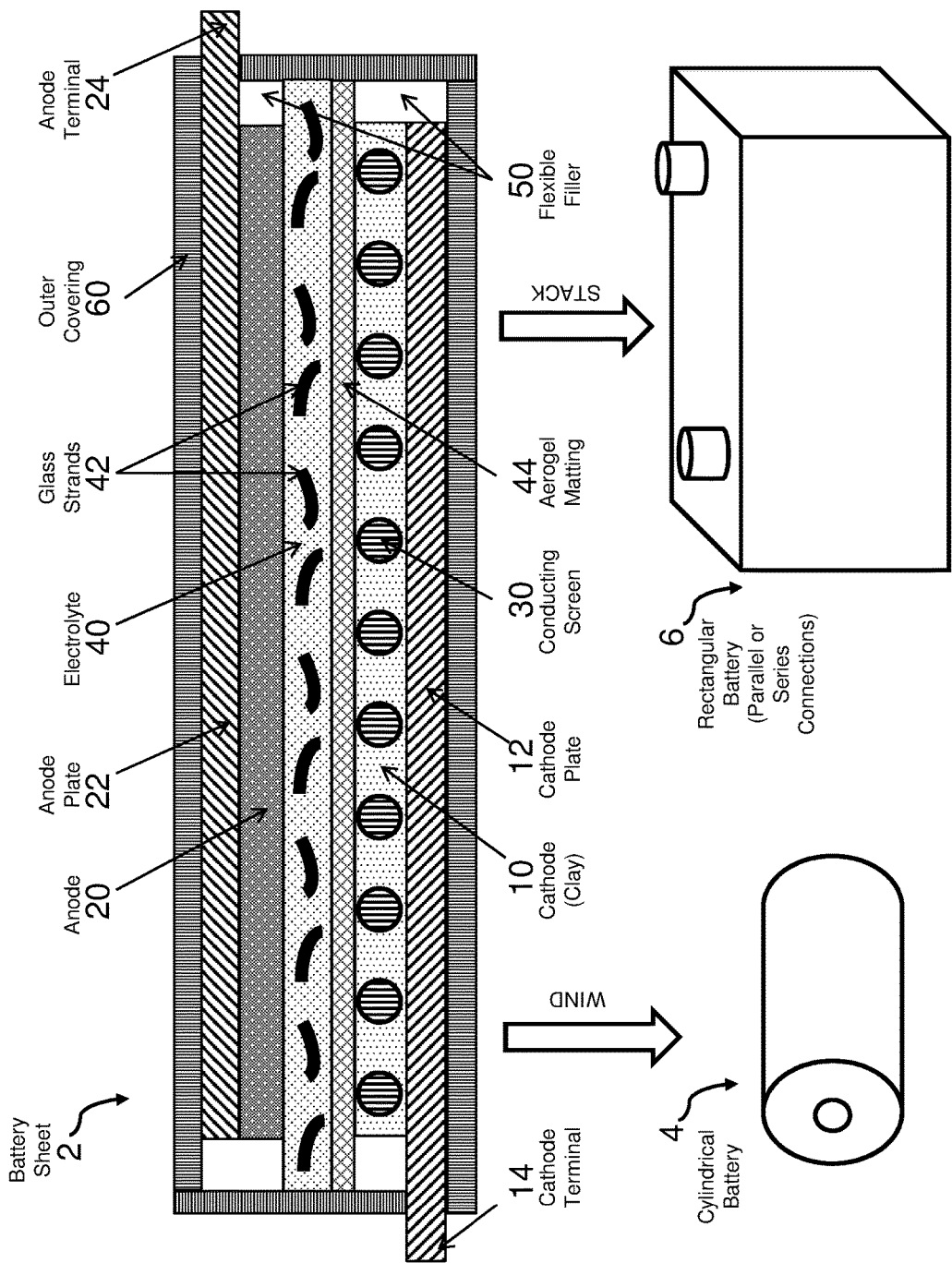

SECONDARY BATTERIES WITH IMPROVED ELECTROLYTE

TECHNICAL FIELD

The present disclosure is directed to the field of secondary batteries, and, more specifically, to batteries in which the separator includes a non-conductive aerogel matting and in which the electrolyte includes a magnesium-containing compound in a solvent, such as a tetrahydofuran derivative or a pyridine derivative. In an exemplary battery, a smectite clay having vacant galleries for intercalation of magnesium is well-suited for use as the active material of the cathode. In one version, the active material of the negative electrode (or anode) material is magnesium or a magnesium alloy.

BACKGROUND

Secondary batteries are batteries in which the chemical reaction that generates electrical energy is electrically reversible. Commonly used secondary cell ("rechargeable battery") chemistries are lead-acid (such as a conventional automobile battery), nickel cadmium (NiCd), nickel metal hydride (NiMH), lithium ion (Li-ion), and lithium ion polymer (Li-ion polymer). These batteries offer the benefit of repeated use and recharging, thereby extending the life of the battery as compared to a conventional primary battery, in which the electricity-producing chemical reaction is a one-way reaction that eventually consumes the component materials.

In recent years, the use of lithium-ion (Li-ion) batteries has expanded from small appliance applications to larger scale applications. Most recently, Li-ion batteries have been considered for use in electric vehicles, such as gas-electric hybrid automobiles and electric-only automobiles. Although such batteries are effective in many of these applications, insufficient thought appears to have been given to the availability of lithium, as compared to the world demand for lithium for use in batteries for conventional purposes, as well as for transportation.

World reserves of lithium are currently estimated to be on the order of about twenty-eight million tons, making lithium one of the more uncommon elements on the Earth's surface. Only about four hundred thousand tons of lithium are located within the borders of the United States, with the bulk of the world's reserves being located within Bolivia, China, and Russia. As demand for lithium continues to increase worldwide, one can readily predict that other countries and regions may seek to control their supply of lithium, either for their own internal use or to inflate market price.

To have adequate capacity for practical use by consumers, a typical plug-in hybrid car requires a battery pack weighing at least six hundred pounds, at least forty pounds of which is lithium. To convert the entire population of three hundred million automobiles in the United States to a lithium-based battery system would require about six million tons of lithium, exceeding the U.S. supply of lithium by a factor of fifteen to one.

Extrapolating the situation worldwide to a population of roughly eighteen times that of the United States, a conservative estimate for lithium demand would be approximately sixty million tons, thus exceeding the global supply of lithium by a factor of more than two to one.

Because lithium is fairly rare, some battery manufacturers have sought to produce effective battery systems using more abundant materials, such as magnesium, which has been explored with some degree of success. Magnesium batteries have substantial promise as rechargeable systems for many battery applications, including the electric car, portable electronics, and tools. Whereas some alkali metals (such as lithium) are highly flammable and may be poisonous, alkaline earth metals (such as magnesium) are easy to process and exhibit stable behavior. Additionally, magnesium is the third most common metal that can remain unprotected in the Earth's atmosphere, with the world reserves of magnesium being on the order of at least eight billion tons. Moreover, vast amounts of magnesium salts are dissolved in sea water and recoverable therefrom.

As compared to a lithium battery, a magnesium battery may require approximately twice as much metal—that is, about eighty pounds per battery pack. With this greater requirement, the world demand for magnesium batteries (for vehicle usage alone) could possibly reach as much as twelve million tons. However, because of the abundance of magnesium, the global supply of magnesium far exceeds the demand by a factor of at least six hundred fifty to one.

Accordingly, a need exists in the industry for a durable battery made of readily abundant materials, which may be easily assembled and repeatedly recharged. The present disclosure addresses such a need.

SUMMARY

Provided herein is an electrochemical cell for a secondary battery, which includes a positive electrode having an active intercalation cathode material of treated smectite; a negative electrode material having an active anode material containing magnesium; an electrolyte, which includes a magnesium salt or complex in a solvent, such as a tetrahydofuran or pyridine derivative; and a separator of a non-conductive porous insulation layer acting as an aerogel; wherein the active intercalation cathode material and the separator are embedded in the electrolyte. To increase its conductivity, the smectite cathode material is treated, before cell assembly, with an acid and/or intercalated with an anilinium ion, which is then polymerized to form a polyaniline within the smectite framework.

According to one aspect, the active anode material is a magnesium/aluminum alloy.

The electrolyte used in conjunction with the magnesium-containing anode material is a magnesium salt or complex in a solvent, which is immobilized within a fine mesh and/or with glass fibers.

In another aspect, the cell further includes a conducting screen within the electrolyte and proximate the cathode material, thereby creating parallel pathways for ion transfer to and from the cathode material.

BRIEF DESCRIPTION OF THE DRAWINGS

A full and detailed disclosure is set forth in the accompanying specification, which makes reference to the appended figures, in which:

FIG. 1 is a schematic representation of a first battery, shown in cross-section, in wound form, and in parallel or series, according to the teachings herein.

DETAILED DESCRIPTION

Reference is now made to the drawings for illustration of various components of the present electrochemical cells. While the particular illustrations provided herein are directed to a magnesium-based battery, various elements and embodiments may be equally applicable to batteries containing other alkaline earth metals. An electrochemical battery sheet 2 is shown, which includes various component layers. However, multiple battery sheets 2 may be cooperatively wound to form a cylindrical battery 4, or may be stacked in parallel or in series to form a larger rectangular battery 6. Further, whereas the battery sheets 2 are shown as having a substantially rectangular shape, the component materials may be assembled to create cells having other shapes, such as cylindrical, in which the anode material is housed within a tube made of a separator material, and the cathode material is impregnated within the electrolyte in the area surrounding the separator tube.

Cathode

As referred to herein, the "cathode" material is the part of the cell that, during use, oxidizes the anode or absorbs electrons. As shown in FIG. 1, the cathode material is identified as element 10. When the cell is discharging electricity, the positive electrode is the cathode. Conversely, when the cell is being recharged, the polarity is reversed, and the negative electrode is the cathode. For ease of discussion, descriptions of the cathode that follow are made in reference to the positive electrode and to the electron-absorbing state of the cathode material, unless otherwise specifically stated.

Generally speaking, for secondary batteries that will be recharged at ambient temperatures, such as the magnesium batteries described herein, the cathode (or "positive electrode") may be either a liquid cathode or a solid cathode. While liquid cathodes facilitate the reaction process and preserve high activity level, care must be taken to prevent contact between the liquid cathode and the anode, which would short-circuit the cell.

Solid cathodes, on the other hand, are most easily incorporated in those situations in which the cathode material is insoluble in the electrolyte material, and the cathode material is capable of quickly and reversibly receiving and releasing a charge-compensating ion. An intercalation cathode is a prime example of a solid cathode of this variety. Intercalation chemistry focuses on the insertion of ions or neutral molecules into an inorganic or organic matrix. In a typical intercalation cathode, cations dissolved in the electrolytic solution are inserted into an inorganic matrix structure.

One particularly abundant intercalation material are clay minerals in the smectite group, which includes dioctohedral smectites (2:1 ratio of tetrahedral sheets surrounding a central octahedral sheet) and trioctohedral smectites. Examples of dioctohedral smectites include montmorillonite, nontronite, and beidellite. Examples of trioctohedral smectites include hectorite (Li-rich), saponite (Mg-rich), and sauconite (Zn-rich).

Smectites are a group of phyllosilicate minerals that swell in water and that possess high cation-exchange capacities. Because of these high cation-exchange properties, smectites are an effective material for use as a cathode. The primary atomic constituents of smectite clays are silicon and aluminum, which are ranked second and third, respectively, in terms of abundance in the Earth's crust, with only oxygen being more abundant. In addition to being abundant and readily available, silicon and aluminum are relatively benign elements and are easily handled. Moreover, smectites themselves are abundant worldwide.

The term "bentonite" may refer to a montmorillonite clay, such as sodium montmorillonite, having the typical composition $Na_x(Al_{2-x}Mg_x)(OH_2)Si_4O_{10}$, where the aluminum and magnesium ions form an octahedral sheet-like layer between two tetrahedral layers of silicate. Another type of bentonite clay is calcium montmorillonite, or "Fuller's Earth," in which the intercalation layer contains hydrated $Ca^{+2}$ ions (instead of the $Na^+$ ions mentioned above). Bentonite clays often have a number of impurities (such as quartz, zeolite, and cristobalite) lodged within the matrix structure, and the removal of such impurities has been found to improve ionic transfer. Alternately, or in addition, the introduction of a conductive species into the clay matrix has been found to improve conductivity.

Like other smectites, natural bentonite clay may be chemically modified, for example, by treating with sulfuric acid, to remove impurities and to extract a portion of the alkali and alkaline earth components, so that the final product (that is, the "acid-treated smectite") has the form of a broken silica framework. This broken silica framework features vacant galleries between the parallel layers that have been found to be receptive to the electrochemical intercalation, or introduction, of these same alkali and alkaline earth metal ions, thereby providing an effective mechanism for the electrochemical transfer characteristic of a battery system.

The movement of metal ions from the anode into, and out of, the vacant galleries in the intercalation material—in this case, the acid-treated smectite—generates a flow of electrons that produces electrical energy. Since the process is reversible, intercalation cathodes made of bentonite or other members of the smectite group are well-suited for use as positive electrodes in electrochemical cells, as described herein. These properties are documented by B. P. Bakhmatyuk et al., in "Intercalation of Bentonite: Thermodynamics, Kinetics, and Practical Applications," *Inorganic Materials*, Vol. 43, No. 5 (May 2007), pp. 537-540, the disclosure of which is hereby incorporated by reference in its entirety.

Another method of enhancing the conductivity of a smectite cathode is to intercalate the smectite material with an anilinium ion ($C_6H_5NH_3^+$), the objective being to introduce an aniline salt or ion into the galleries in the inorganic clay matrix and then to polymerize the salt or ion within the matrix. The anilinium ion may be produced by reacting aniline with hydrochloric acid to create anilinium chloride, as shown below.

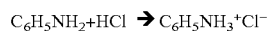
$$C_6H_5NH_2 + HCl \rightarrow C_6H_5NH_3^+Cl^-$$

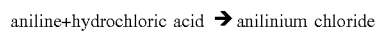
aniline+hydrochloric acid → anilinium chloride

The anilinium ion may be introduced into the matrix by a multi-step process in which the clay is first dispersed in ammonium chloride to exchange the cations with ammonium ions and then reacting the ammonium-containing clay with an anilinium chloride solution, such that the anilinium ions are exchanged for the ammonium ions. The anilinium ions are then believed to be oxidatively polymerized into polyaniline by iron (III) present in the smectite clay—for instance, in Fuller's Earth (montmorillonite) clay, the iron may be in the form of $Fe_2O_3$ in an amount of about 4.8%. After various washing, stirring, and centrifuging steps, the process of reacting the clay with anilinium chloride solution may be repeated, if desired, to more fully load the galleries in the matrix with polyaniline molecules. This approach is documented by R. M. G. Rajapakse et al., in "Mixed-Conducting Polyaniline-Fuller's Earth Nanocomposites Prepared by Stepwise Intercalation," *Electrochimica Acta*, Vol. 51 (2006), pp. 2483-2490, the disclosure of which is hereby incorporated by reference in its entirety.

While the documents referenced above are specific to the preparation of an acid-treated bentonite or a polyaniline-intercalated bentonite, it should be understood that any smectite may be so treated. Thus, as used herein, the term "treated smectite" may refer to any mineral clay, as described above, which has been treated with an acid to provide vacant galleries for intercalation of magnesium or which has been intercalated with a polyaniline to enhance conductivity and, hence, power density. Once treated, the treated smectite is ground to an average grain size of between about 15 microns and about 25 microns.

Thus, the treated smectite material acts as the reactive component of the cathode 10. To facilitate electron flow, the cathode 10 is dispersed in a compatible electrolyte. Additionally, a conductive screen 30 of a very fine mesh may be embedded within the compatible electrolyte, thereby creating parallel pathways for ion transfer to and from the cathode material. In this instance, the mesh openings may be measured in microns.

The cathode-active material in the high energy density, rechargeable battery is paired with a suitable anode-active material, which is most commonly made of an active metal, such as an alkaline earth metal (e.g., magnesium), as will be discussed below. A compatible electrolyte is chosen to enhance the ion-exchange properties of the cathode and anode, examples of which are provided further herein.

Anode

As referred to herein, the "anode" material is the part of the cell that, during use, releases, or gives up, electrons. As shown in FIG. 1, the anode material is identified as element 20. When the cell is discharging electricity, the negative electrode is the cathode. Conversely, when the cell is being recharged, the polarity is reversed, and the positive electrode is the anode. For ease of discussion, descriptions of the anode that follow are made in reference to the negative electrode and to the electron-releasing state of the anode material, unless otherwise specifically stated.

Magnesium and aluminum metal are useful as the reactive anode materials because they are easy to process, non-toxic, and non-hazardous. Magnesium and aluminum are reactive, but do not undergo rapid reaction at the surface, thereby rendering anodes made of one or both of these materials highly stable. Because of their abundance, magnesium and aluminum are also inexpensive, as compared with alkali metals, such as lithium. In one instance, the anode material may be made of magnesium. Alternately, a magnesium/aluminum alloy may be used, in which the majority of the anode material is made of magnesium and aluminum is present in minimal amounts.

When used in combination with the acid-treated and/or polyaniline-containing smectite cathode described above and a compatible electrolyte, magnesium ($Mg^{+2}$) ions migrate into and out of the silica framework of the cathode material, thereby generating a flow of electrons that produces an electric current.

Electrolyte

The choice of electrolyte impacts the function of the battery and merits attention. Some electrolytes are known to perform well with a particular cathode-anode couple and to be ineffective or significantly less effective with other cathode-anode couples, either because the electrolyte is not inert or because it degrades during cycling.

Suitable electrolytes satisfy requirements of power and energy density, chemical stability, reasonable cost, sufficiently low toxicity, sufficiently low flammability, sufficiently low volatility, and sufficiently low oxidative capability. It has been found that immersing an immobilizer, such as a non-conductive porous insulation layer 44, which acts as an aerogel, can reduce flammability and volatility. Using components which are oxygen free avoids oxidative capability of the electrolyte. It has been difficult to identify electrolytes capable of meeting these many desirable qualities.

An improved electrolyte, as described herein, includes a primary solute "AR", where A belongs to the anode and R is a radical defining the ionization in solution. A second solute having a similar formula but a different radical R (e.g., AR') may also be used. The radicals R and R' are inert with respect to the cathode material.

In an example of a primary solute, A represents magnesium, and R represents chlorine, thus forming the compound magnesium chloride. In an example of a second solute, A represents magnesium, and R' represents hexamethyldisilazide (HMDS), thus forming the compound magnesium hexamethyldisilazide.

Recently, a group of researchers at Karlsruhe Institute of Technology in Germany has identified electrolytic solutions containing magnesium hexamethyldisilazide (HMDS) and magnesium chloride as solutes, which are effective for use in a magnesium-sulfur battery. When these compounds were dissolved in tetrahydrofuran (THF) with aluminum chloride, the resulting electrolytes showed acceptable performance and material characteristics in experimental trials. Their study is described in the journal *Advanced Energy Materials* in an article by Zhirong Zhao-Karger et al., which is entitled "Performance Improvement of Magnesium Sulfur Batteries with Modified Non-Nucleophilic Electrolytes," published online on Oct. 6, 2014, and printed in the journal's Vol. 5, No. 3, on Feb. 4, 2015, the entire disclosure of which is hereby incorporated by reference.

Despite the acceptable performance and material characteristics identified by the article's authors, the use of tetrahydrofuran as the primary (or majority) solvent has several drawbacks, including its toxicity, flammability, and volatility. It would be desirable to replace tetrahydrofuran with one or more other solvents, which have a Hansen solubility parameter similar to that of tetrahydrofuran, but which have properties that are more favorable in terms of toxicity, flammability, and volatility. Tetrahydrofuran has a total Hansen solubility parameter of 19.4, where the total solubility parameter is the geometric mean of the three components $\delta_d$ (from dispersion interactions), $\delta_p$ (from polar attraction), and On (from hydrogen bonding). The $\delta_d$ of tetrahydrofuran is 16.8; the $\delta_p$ of tetrahydrofuran is 5.7, and the On of tetrahydrofuran is 8.0.

A derivation of tetrahydrofuran is 2-methyl tetrahydrofuran, which is less toxic and less flammable. Such a derivative may be an effective substitute for tetrahydrofuran.

Another class of solvents, which are useful as the primary (or majority) solvent, are derived from pyridine ($C_5H_5N$), which has a total solubility parameter of 21.8 ($\delta_d$=19.8, $\delta_p$=8.8, and $\delta_h$=5) and which lacks any oxygen atoms that might otherwise attack the anodal magnesium. These pyridine derivatives, which include ethyl and/or methyl groups at two of the carbon atoms on the pyridine ring, are more benign than tetrahydrofuran. Examples of such pyridines include 2,5-dimethyl pyridine; 2,6-dimethyl pyridine; 3,5-dimethyl pyridine; 2,5-diethyl pyridine; 5-ethyl-2-methyl-pyridine; 2-ethyl-5-methyl-pyridine; 5-ethyl-3-methyl-pyridine; and 3-ethyl-5-methyl pyridine, which have similar capabilities as tetrahydrofuran for dissolving the magnesium compounds described above. These solvents have the advantages of being oxygen-free, of having low or negligible toxicity, and having low or negligible volatility. Additionally, because these solvents are composed of hydrogen, carbon, and nitrogen (among the most common elements), these solvents are readily available.

Another suitable co-solvent (secondary or minority solvent) for use in the present electrochemical cell is pinene ($C_{10}H_{16}$), which is a bicyclic monoterpene chemical compound. Pinene may be derived from some trees and plants, but may also be synthesized in the lab. Pinene is relatively low in flammability and volatility. While pinene alone may be insufficient to dissolve the magnesium compounds described herein, a mixture of 5-ethyl-2-methyl-pyridine with varying amounts of pinene offers the ability to optimize the solution at the most desirable performance. Although pinene is not highly soluble in the primary solvent or primary solvent mixture, pinene (in soluble quantities) is sufficient to exert control over volatility and flammability. Alternately, ocimene may be used instead of or with pinene, as a secondary solvent or co-solvent, which is present in a minority amount of the total electrolyte solvent volume.

Solvents of higher polarity, such as gamma butyrolactone ($C_4H_6O_2$, also known as dihydrofuran-2(3H)-one), may also be used as the electrolyte solvent. Such higher polarity solvents are relatively benign, but may be oxidizers in some circumstances.

Residual escape of the solvent, as may occur with volatility, may be compensated by providing the electrochemical cells 4,6 with ports for adding additional solvent (or solvent mixture) as is done with other battery types.

Separator

As shown in FIG. 1, a separator 44 may be encased within the electrolyte 40 between the cathode layer 10, in which the cathode material is embedded in the electrolyte 40, and the anode layer 20. The separator 44 may be a non-conductive porous insulation material, made of carbon or silica, which acts as aerogel matting. An aerogel matting is a matrix of a solid material of extremely low density, produced by removing the liquid component from a conventional gel. The porous insulation material may provide channels for ion transfer between the anode material and the cathode material. Examples of commercially available porous insulation materials are nonpolar fluoropolymers, such as polyvinylidene fluoride (PVDF), which may be sold under the trademark KYNAR® by Arkema, Inc. of King of Prussia, Pa.; polytrifluoroethylene (PTRFE); and polytetrafluoroethylene (PTFE), the last of which may be sold by various suppliers under the licensed trademark TEFLON®.

Assembly

FIG. 1 provides a schematic illustration of an electrochemical battery sheet 2 having an active cathode layer 10 of smectite, which has been treated with acid, intercalated with polyaniline, or both, and incorporated within the electrolyte solution; an active anode layer 20 of magnesium or a magnesium-based alloy; and an electrolyte layer 40 (as described above), which is positioned between the active cathode material 10 and the active anode material 20. A conducting screen 30 may be positioned within the cathode layer 10 to promote ion transfer. The pore size of the screen 30 may be commensurate in size with the average grain size of the active cathode material 10 (e.g., from about 15 to about 25 microns).

Electrical contact plates 12, 22, having terminals 14, 24 are positioned in contact with the electrode materials 10, 20, respectively. These contact plates 12, 22 and terminals 14, 24 may be made of materials including, but not limited to, carbon, copper, nickel, lead, gold, and other similar electrically conductive metal or metal alloy. The active cathode material 10, the electrolyte 40, and the active cathode material 20 are held within a housing 60, which permits handling of the electrochemical cell 2. The housing 60 is a non-electrically conductive material, such as a plastic or rubber material.

To prepare the electrolyte 40, a first metal compound having the formula $MgCl_2$ and a second metal compound having the formula $Mg(HMDS)_2$ are dissolved in a solvent or solvent mixture. Examples of suitable solvents are provided above. A battery separation layer in the electrolyte 40 may include a non-conductive aerogel matting 44 with fibrous glass (fiberglass) strands 42 optionally attached thereto, to provide additional stability to the secondary battery cell 2. The active materials of the anode and the cathode may then be positioned on opposite sides of the electrolyte 40. A flexible filler material 50 may be used to fill in any voids around the cathode material 10, the anode material 20, and the electrolyte 40.

In some instances, it may be desirable to secure the terminals 14, 24 to the respective electrode materials 10, 20 by an electrically-conductive binder material, such as a glue or adhesive (not shown in the drawing). U.S. Pat. No. 7,063,808, the disclosure of which is hereby incorporated by reference in its entirety, describes examples of such binders, which are composites made of a synergistic blend of a conductive carbon material and either a lignosulfonic acid-doped polyaniline or a sulphonated asphalt-polyaniline. The resulting composite exhibits a greater conductivity than the respective components individually.

Power density of the batteries resulting from the connection of multiple electrochemical cells, as described above, is affected by the thickness of the material layers (10, 20, and 40). The stacked materials 2 may be cut into uniformly sized sheets, which may be wound around a central post or stacked to form a cylindrical secondary battery cell 4 with the rolled ends capped to form terminals. Slender battery cells 4 may be assembled in parallel or in series to form super cells 6, which tend to exhibit lower electrical/mechanical resistance per unit mass without comparable changes in thermal resistance, thus allowing power density to be optimized at the discretion of the manufacturer.

The electrochemical cells may be connected in series to form larger standard battery units having representative dimensions of 4"×4"×6" in size and having a capacity of approximately 6 to 8 volts. Standard units can be connected in series to form battery packs having representative dimensions of 18"×16"×12" to provide 300 volts for AC traction motors. Four packs, weighing about 600 pounds total, may be used to drive an electric or hybrid car for 100 to 200 miles.

The power density values of ½ per kilogram (or 150 KW for a small car carrying 300 kg) are estimated from data obtained at the Center for Renewable Energy Research at the University of Louisville in Louisville, Ky. The estimated wattage of 150 kilowatts is equivalent to about 200 horsepower (or 320 horsepower of internal combustion power).

The electrochemical cells 2, 4, 6 utilize abundant, readily available, non-toxic, and flame resistant starting materials for the active cathode material 10, the electrolyte 40, and the active anode material 20 to produce an economical and efficient battery. Further, these cells 2, 4, 6 exhibit the energy density and longevity necessary for use in large applications, such as plug-in hybrid-type vehicles.

The preceding discussion merely illustrates the principles of the present battery system. It will thus be appreciated that those skilled in the art may be able to devise various arrangements, which, although not explicitly described or shown herein, embody the principles of the inventions and are included within their spirit and scope. Furthermore, all examples and conditional language recited herein are principally intended expressly to be only for pedagogical purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

I claim:

1. An electrochemical cell for a secondary battery, the electrochemical cell comprising:
    a positive electrode having an active intercalation cathode material with a reactive component, wherein the reactive component includes treated smectite having vacant galleries for intercalation of magnesium;
    a negative electrode having an active anode material comprising magnesium; and
    an electrolyte positioned in contact with at least one of the positive electrode and the negative electrode, wherein the electrolyte comprises at least a primary solvent in which at least magnesium chloride and aluminum chloride are dissolved; and
    wherein the primary solvent is one or more of 2,5-dimethyl pyridine; 2,6-dimethyl pyridine; 3,5-dimethyl pyridine; 2,5-diethyl pyridine; 2-methyl-5-ethyl-pyridine; 2-ethyl-5-methyl-pyridine; 5-ethyl-3-methyl-pyridine; and 3-ethyl-5-methyl pyridine.

2. The electrochemical cell of claim 1, wherein the primary solvent further comprises 2-methyl tetrahydrofuran.

3. The electrochemical cell of claim 1, wherein the primary solvent comprises 2-methyl-5-ethyl pyridine and 2,6-dimethyl pyridine.

4. The electrochemical cell of claim 1, wherein a secondary solvent is used in combination with one or more of the primary solvents, the secondary solvent being at least one of pinene and ocimene.

5. The electrochemical cell of claim 4, wherein the secondary solvent is pinene.

6. The electrochemical cell of claim 1, wherein the electrolyte further comprises magnesium hexamethyldisilazide dissolved in the solvent.

7. The electrochemical cell of claim 1, wherein the reactive component of the active intercalation cathode material has an average grain size of between 15 microns and 25 microns.

8. The electrochemical cell of claim 1, wherein the active anode material is a magnesium/aluminum alloy.

9. The electrochemical cell of claim 1, wherein the electrolyte further comprises a non-conductive porous insulation layer positioned therein, the porous insulation layer acting as an aerogel.

10. The electrochemical cell of claim 9, wherein the electrolyte further comprises a plurality of glass fibers attached to the non-conductive insulation layer.

11. The electrochemical cell of claim 1, wherein the vacant galleries of the treated smectite are intercolated with polyaniline to enhance conductivity and power density.

12. The electrochemical cell of claim 1, further comprising a conductive screen positioned within the cathode material.

* * * * *